Sept. 5, 1944.  A. V. HUENNEKENS ET AL  2,357,514
HYDRAULIC CARRIAGE FEED
Filed Nov. 14, 1942  3 Sheets-Sheet 1
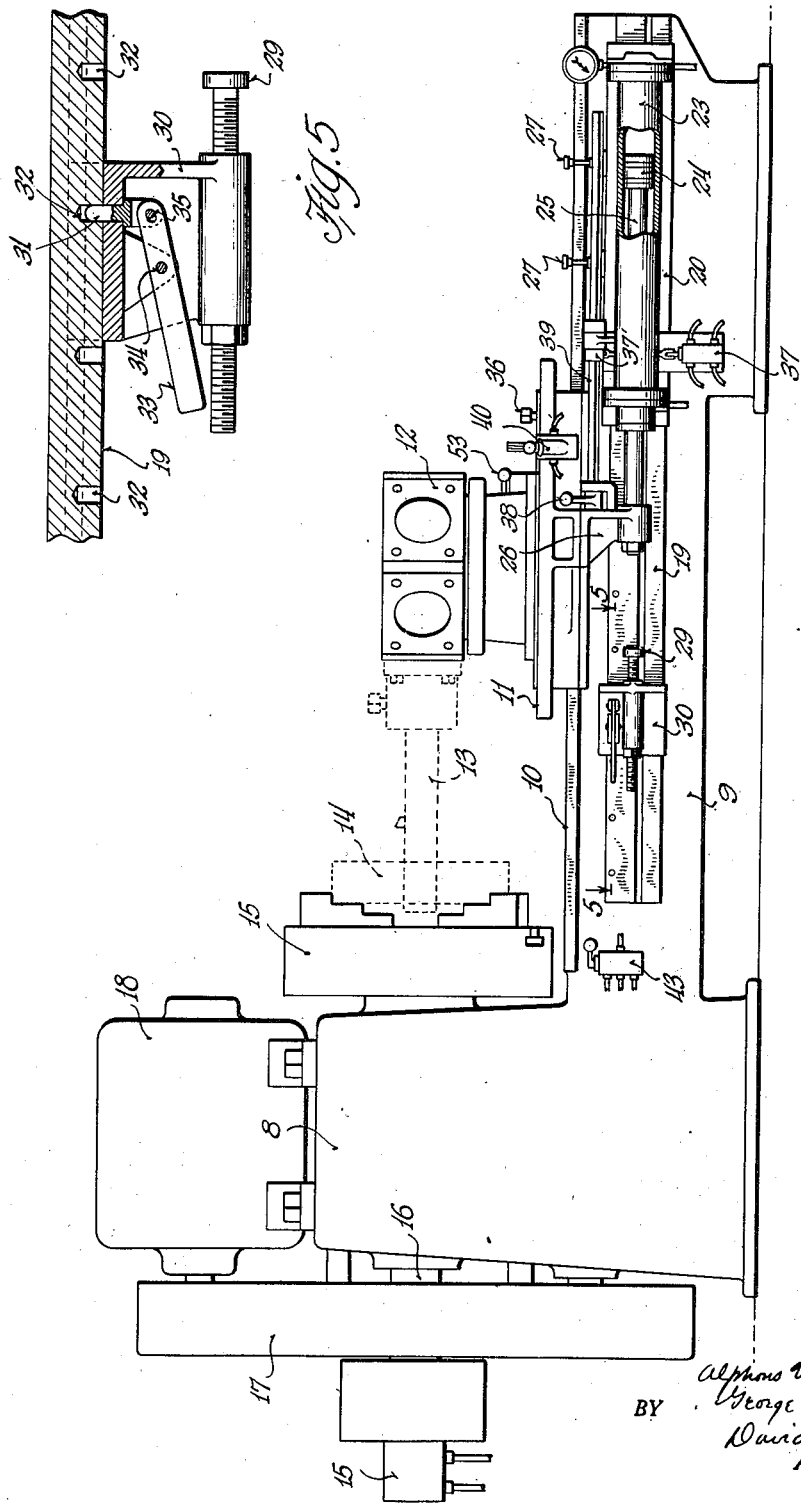
INVENTORS
Alphons V. Huennekens
George L. Gavin
David G. Fox
BY
ATTORNEY.

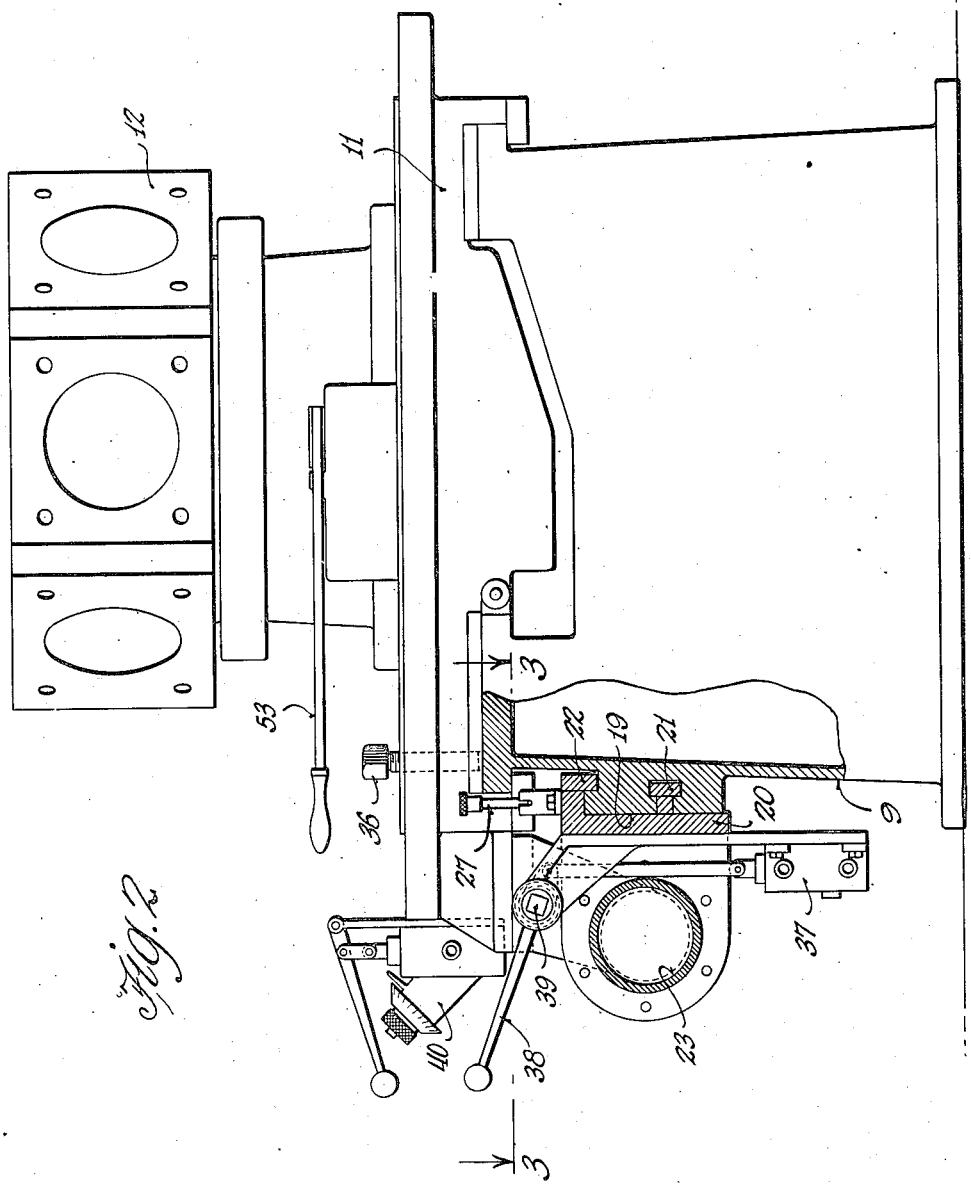

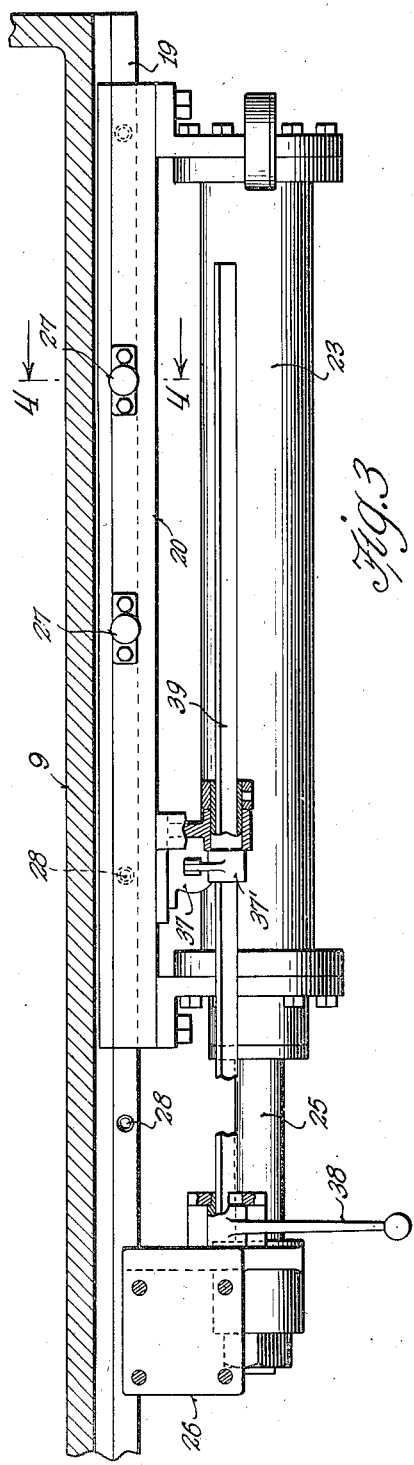
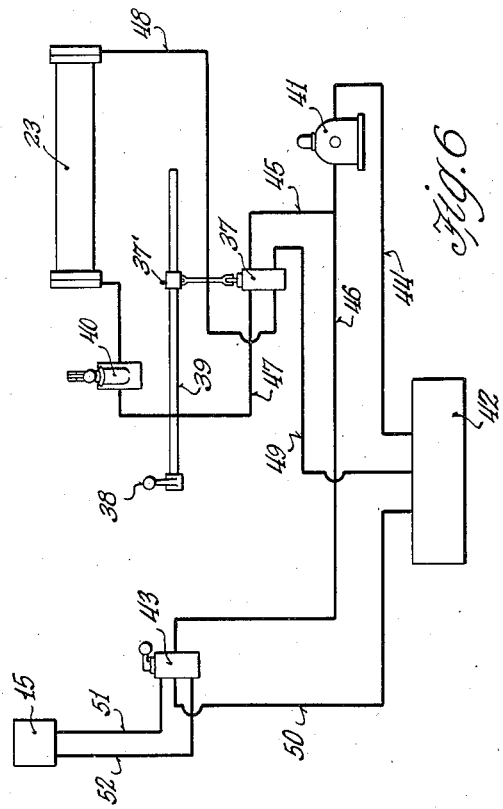
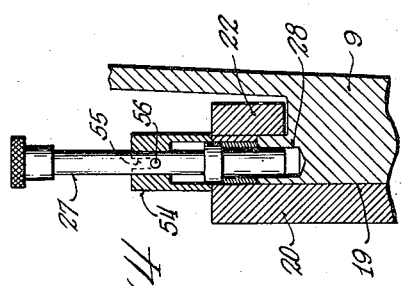

Patented Sept. 5, 1944

2,357,514

UNITED STATES PATENT OFFICE 2,357,514

HYDRAULIC CARRIAGE FEED

Alphons V. Huennekens and George L. Gavin, Milwaukee, Wis., assignors to Harnischfeger Corporation, Milwaukee, Wis., a corporation of Wisconsin Application November 14, 1942, Serial No. 465,588

3 Claims. (Cl. 29—42)

The invention relates to turret lathes.

The object of the invention is to provide a turret lathe in which the feed of the turret head is hydraulically controlled and is effected by an hydraulic cylinder which may be advanced or retracted lengthwise of the bed under its own power through its connection with the turret head so that the turret may have different spheres of operation relative to the lathe bed to accommodate for different sizes and types of work, at the same time employing an hydraulic cylinder having a stroke substantially less than the scope of accommodation of said turret on said bed.

The invention further consists in the several features hereinafter set forth and more particularly defined by claims at the conclusion hereof.

In the drawings:

Fig. 1 is a side elevation view of a turret lathe embodying the invention, parts being broken away and parts being shown in section;

Fig. 2 is an end elevation view of the lathe, parts being broken away and parts being shown in section;

Fig. 3 is a detail sectional view taken on the line 3—3 of Fig. 2;

Fig. 4 is a detail sectional view taken on the line 4—4 of Fig. 3;

Fig. 5 is a detail sectional view taken on the line 5—5 of Fig. 1;

Fig. 6 is a diagrammatic view of the hydraulic system.

In the drawings, the numeral 8 designates the head stock of the lathe and 9 the bed having ways 10 along which the carriage 11 of the turret is free to slide. The carriage 11 has the revoluble turret head 12 mounted thereon and adapted to carry various tools, one of which, 13, is indicated in dotted lines in Fig. 1 as a boring tool engageable with the work 14 held in a hydraulically operated chuck 15 mounted on the head stock spindle 16 which is rotated by a suitable belt and pulley drive connection 17 with the electric motor 18. As in all turret lathes, while the work is rotating, the tools on the turret head 12 are successively moved into and out of engagement with the work with the indexing of the head in its different positions.

A special way 19 is provided on the front side of the bed 9, and a carriage 20 with suitable gib connections 21 and 22 is slidably mounted on this way and carries an hydraulic cylinder 23 in which a piston 24 is slidably mounted having a piston rod 25 working through a suitable stuffing box (not shown) in one end of the cylinder and connected to an arm 26 formed integral with or connected to the carriage 11. The carriage 20 may be locked in different positions along the way 19 by means of one or more pins 27 mounted in said carriage and adapted to engage in one or more spaced holes 28 in the way 19.

The tool feeding movement of the carriage 11 is limited by a stop 29 which is adjustably secured in threaded engagement with a bracket 30 slidably mounted on the way 19 and adapted to be held in one of a plurality of positions by means of a locking pin 31 mounted in the bracket 30 and adapted to be inserted in one of a series of holes 32 in the way 19. The locking pin 31 is operated by a lever 33 pivoted intermediate its ends at 34 and operatively connected by a pin and slot connection 35 with the outer end of said pin.

The carriage 11 may be locked to the bed of the lathe in different positions along the ways 10 by means of a clamp 36 having threaded engagement with said carriage and clampingly engageable with one of said ways 10.

The hydraulic cylinder 23 with the piston 24 is of the double acting type with the alternate introduction of pressure fluid into the cylinder 23 under the control of any suitable reversing valve 37 mounted on the carriage 20 and whose operation is manually controlled by a lever 38 mounted on a square shaft 39 carried by the carriage 11 and slidably keyed to the hub of the reverse valve operating lever 37'. Thus while the lever 38 and shaft 39 move with the carriage 11, the shaft 39 may move lengthwise relative to carriage 20 during the adjustment of the carriages 11 and 20 relative to each other and also during the feed of the carriage 11 by the operation of the piston 25, the lever 38 being arranged near a feed rate control valve 40 and in convenient reach of the operator of the lathe as he stands at the side thereof to direct the movement of the carriage 11.

As shown in Fig. 6 the hydraulic circuit also includes a manually controlled throttle and by-pass valve 40 of known construction, a constant pressure pump 41 adjustable for various pressures, and a sump 42. The hydraulic chuck 15 is controlled by a suitable control valve 43 of known construction. Operating fluid is supplied from the sump 42 through a pipe 44 to the inlet of the pump 41 which delivers it through pipes 45 and 46 to the reversing valve 37 and control valve 43, respectively. Piping 47 connects the valve 37 and the valve 40 with the front end of the cylinder 23. A pipe 48 connects the valve 37 with the back end of the cylinder 23. A fluid return pipe 49 connects the valve 37 with the sump 42. A pipe 50 connects the valve 43 with the sump, and pipes 51 and 52 connect the chuck 15 with opposite sides of the valve 43.

A lever 53 forms a part of the turret head lock mechanism to secure it in its indexed positions.

The pins 27 may be secured in unlocked position by providing a cap 54, as shown in Fig. 4, axially alined with the hole 28 and provided with a diametrically disposed slot 55 forming a guide for a cross pin 56 on the pin 27 to permit said pin 27 to enter the hole 28 or to be withdrawn therefrom until the pin 56 clears the top of said cap 54 where it can be rotated at right angles to the slot 55 in which position the pin 27 is clear of the hole 28.

The chuck 15 and its hydraulic control are of known construction and operate in known manner to hold the work 14 in the chuck jaws while being operated on by the various tools on the turret head and thereafter release the finished work.

With the valve 37 set in position for forward feed the pump 41 delivers the hydraulic operating fluid through the pipe 48 to the back end of the cylinder 23, thus moving the piston 24 toward the left along with the carriage 11 and head 12 to move the tool 13 into the work 14. The speed or rate of movement of the carriage is controlled by the proper setting of the throttle valve 40 controlling the release of exhaust fluid from the front end of the cylinder 23 through the pipe 47. When the outer end of the rod 25 strikes the stop 29, the forward feed of the tool 13 is stopped, and then by shifting the valve 37 to its reverse position the pressure fluid is released from the back end of the cylinder 23 through the pipe 48, valve 37, pipe 49 to the sump 42 while fluid is delivered through pipe 47 past the check valve of the valve 40 into the front end of the cylinder 23, thus causing the piston 24 and carriage 11 to feed toward the right to withdraw the tools from the work.

The hydraulically operated piston 24 and its cylinder 23 is of limited length, so that the carriage 11 cannot be moved the entire length of the lathe bed 9. Under some conditions in setting up for work of different sizes the carriage 20 must be shifted along the ways 19 from the position shown in the drawings. For effecting this shifting movement, the carriage 11 may be locked against movement relative to the ways 10 by the clamp pin 36 and the pins 27 may then be moved to an unlocked position and then, with the piston 24 in a fixed position, by introducing pressure fluid into the back end of the cylinder 23 the carriage 20 will be moved toward the rear end of the lathe bed or by introducing fluid into the front end of the cylinder 23 the carriage 20 will be moved toward the head stock of the lathe. Thus the carriage 20 may be shifted to different positions lengthwise of the lathe, so that the carriage 11 may be operated in different areas of the ways 10 of the lathe without the necessity for a hydraulic cylinder having a stroke equal to the full length of the bed.

We desire it to be understood that this invention is not to be limited to any particular form or arrangement of parts except in so far as such limitations are included in the claims.

What we claim as our invention is:

1. In a turret lathe having a work holder, a bed, and a carriage movable along the bed and provided with a tool carrying head, the combination of a carriage mounted for lengthwise shifting movement on the side of said bed, releasable means for securing said last named carriage against movement relative to said bed, a cylinder mounted on said last named carriage, a hydraulically operated piston working in said cylinder and connected to the first named carriage, means for securing said first named carriage against movement relative to the bed to hold said piston and permit changing the position of said cylinder carrying carriage relative to said bed through the action of hydraulic fluid acting on said cylinder.

2. In a turret lathe having a work holder, a bed, and a carriage movable along the bed and provided with a tool carrying head, the combination of a carriage mounted for lengthwise shifting movement on the side of said bed, releaseable pins for securing said last named carriage against movement relative to said bed, a cylinder mounted on said last named carriage, a hydraulically operated piston working in said cylinder and connected to the first named carriage, a pin for securing said first named carriage against movement relative to the bed to hold said piston and permit changing the position of said cylinder carrying carriage relative to said bed through the action of hydraulic fluid acting on said cylinder.

3. In a turret lathe having a work holder, a bed, and a tool carriage movable along the bed and provided with a tool carrying head, the combination of a cylinder carrying carriage, a hydraulic cylinder mounted on said last named carriage, a hydraulically operated piston working in said cylinder and connected to said tool carriage, means for supplying opposite ends of said cylinder alternately with hydraulic fluid to reciprocate said tool carriage including a reversing valve mounted on said cylinder carrying carriage, an oscillatory control member for said valve mounted on said tool carriage, and a shaft connected to said control member and operated thereby and having a slidable operating connection with said reversing valve at any instant and in all positions of feed of said tool carriage relative to said cylinder carriage.

ALPHONS V. HUENNEKENS.
GEORGE L. GAVIN.